Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

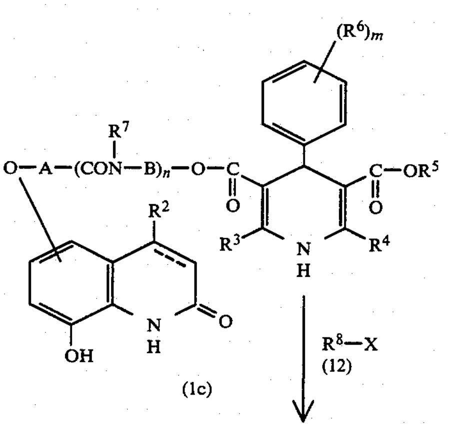

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$v'_{ref}(t) = K\, r\, \delta\left(t - \frac{2L - 2d_s}{v_w}\right) + K(1 - r^2)e^{-2\alpha s d_s}$$

$$\cos\beta^* = \frac{K_2 - n\frac{T'}{v''}}{\sqrt{K_1^2 + \left(K_2 - n\frac{T'}{v''}\right)^2 + K_3^2}}$$

8 PT.

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$(K_1x+K_2y+K_3z+T)+n(K''_1x+K''_2y+K''_3z+T')=0$$

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$

100mm

= 101.2 Aperture ratio: 1:1.10
agnification of projection: −7.997x
alf angle of view: 28.56°

| | | | |
|---|---|---|---|
| 43.454 | $d_1 = 11.0$ | $n_1 = 1.49380$ | $L_1$ |
| -1542.254 | $d_2 = 68$ | | |
| 16.976 | $d_3 = 20.0$ | $n_2 = 1.62286$ | $L_2$ |
| 10.914 | $d_4 = 2.87$ | | |
| -89.375 | $d_5 = 5.0$ | $n_3 = 1.59501$ | $L_3$ |
| -127.071 | $d_6 = 58.8$ | | |
| -48.609 | $d_7 = 5$ | $n_4 = 1.49380$ | $L_4$ |
| ɔ | | | |
| ɔ | $d_8 = 5$ | $n_5 = 1.45000$ | S |
| ∞ | $d_9 = 8$ | $n_6 = 1.51872$ | G |

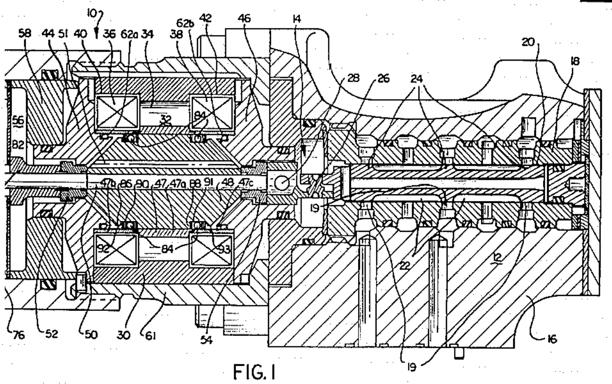

FIG. I

IMAGE SYSTEM
TEST TARGET
A

U.S. DEPARTMENT OF COMMERCE
PATENT AND TRADEMARK OFFICE

PROCESS FOR OBTAINING IRREGULAR SHADOW DYEINGS ON POLYESTER FIBERS AND MIXTURES THEREOF

The present invention relates to a process for obtaining irregular shadow dyeings on polyester fibers and mixtures thereof.

The preparation of local tone-in-tone effects or shadow effects by printing half-discharge pastes or half-resist pastes is known. The printing pastes so applied contain oxidizing or reducing chemicals or reserves having a mechanical effect which destroy the padded, dyed or cross-padded dyestuff entirely or in parts or hamper its fixation.

Moreover, it is known, that disperse dyes in aqueous solutions show a more or less distinctly marked susceptibility to alkalis which leads to difficulties in some dyeing methods, for example, in the single-bath dyeing.

Now it was found that in the padding of polyester fiber-containing warps with sizing liquors which contain in addition to sizing agents alkali-susceptible disperse dyes, and with subsequent drying and waving with undyed or differently dyed weft yarn without prior fixation, irregular, local tone-in-tone effects, shadow effects and multi-color effects can be obtained on polyester fibers and mixtures thereof, preferably with cellulose fibers, by binding the piece goods so obtained ("Denim article") to a rope with or without distortion in warp direction (optionally at about meter intervals), tying them loosely and spraying them irregularly and unevenly from outside with aqueous solutions of alkalis which are free from oxidizing or reducing chemicals, thermosoling them after opening the rope to fix the dyestuff and after-treating them in usual manner.

In the process of the invention, suitable alkalis are the hydroxides, carbonates or triphosphates of alkali metals, preferably sodium hydroxide and sodium carbonate, especially in a concentration of 1 to 25 g/l of sodium hydroxide or 1 to 20 g/l of sodium carbonate, or mixtures of both in the range indicated. Equivalent amounts of potassium hydroxide or potassium carbonate can also be used. The pH value of these solutions measured at 20°C is always between 10.5 and 14.

Depending on the susceptibility to alkalis of the dyestuffs used and on the concentration and the amount of the alkaline solution applied tone-in-tone effects or shadow effects are obtained at the places treated having diffuse outlines on the warps due to a more or less heavily marked local lightening of the disperse dyestuff. This dyestuff cannot be fixed, due to a chemical or physical structure influence, in parts or in total at the places sprayed.

Thus, the process of the invention takes advantage of the susceptibility to alkali of many disperse dyes which is very troublesome in other cases. The lightening effects are irregular with diffuse outlines, are in the form of stripes following about warp direction and have an aspect of the character of not fast dyeings under heavy local strain.

In another form of carrying out the process of the invention, the same effects can also be obtained when finished piece-goods made of polyester fiber/cellulose blends are taken, and the fabric padded with these disperse dyes and dried is subjected in rope form to the alkali treatment described and the operation is continued in corresponding manner.

Suitable disperse dyes for the process of the invention are those of the general formula

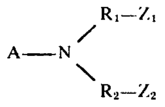

and B — O — $R_3$ wherein A is a mono or disazo dyestuff radical, $R_1$ is a direct bond, $—CH_2—$ or $—C_2H_4—$, $R_2$ is $—CH_2—$ or $—C_2H_4—$, $Z_1$ is —H, —OH, —CN or $—OOC—CH_3$, $Z_2$ is —H,

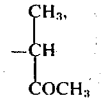

—CN, $—OOC—CH_3$ or

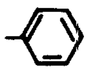

B is an amino-hydroxy-anthraquinone radical substituted or unsubstituted by halogen, $R_3$ is —H, an aryl or alkyl radical, which is linked with the anthraquinone radical over an ether bridge, preferably in 2-position.

The alkaline spraying liquors are in any case free from reducing or oxidizing chemicals, however, if necessary, they contain hydrotropic substances, such as, for example polyalkylene glycols which somewhat favour the lightening in the thermosoling process.

Moreover, alkali-resisting disperse dyestuffs or reactive dyestuffs, the latter ones in the case of polyester/-cellulose blends, can be added to the spraying liquors, the range of patterns in the direction of multi-color effects thus becoming wider.

It was surprising that the sizing agents did not exercise an essential influence on the dyestuff yield, that they even favoured the lightening at the alkalized places and resisted to the thermal conditions of the thermosol process without deteriorating their water-solubility, that is to say, their property of being washed out.

The thermosol process for the fixation of the disperse dyes is carried out in known manner, preferably with dry heat at a temperature ranging from 180° to 230°C.

The disperse dyes and reactive dyes used are known products, for example those registered in Color Index, 3rd edition, vol. 2 or 3 under the name of "Disperse Dyes" and "Reactive Dyes".

The following examples illustrate the invention.

EXAMPLE 1:

Warps made of polyester fiber/cotton-plain yarn (mixing ratio: 67 : 33) was padded on a sizing machine with a sizing liquor, the liquor absorption being 80 %. This aqueous liquor contained per liter 30 g of a high viscous polyvinyl alcohol
32 g of a low viscous polyvinyl alcohol
3 g of an anionic softening agent on the basis of paraffin and
40 g of the disperse dye of the formula Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

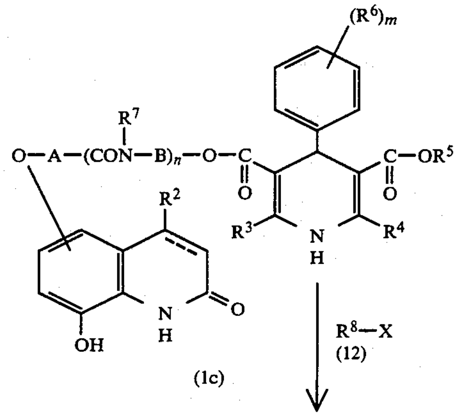

(1c)

$R^8$—X (12)

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

$$v'_{ref}(t) = K\, r\, \delta \left( t - \frac{2L - 2d_s}{v_w} \right) + K(1 - r^2)e^{-2\alpha_s d_s}$$

$$\cos\beta^* = \frac{K_2 - n\frac{T'}{v''}}{\sqrt{K_1^2 + \left(K_2 - n\frac{T'}{v''}\right)^2 + K_3^2}}$$

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

$$(K_1x+K_2y+K_3z+T)+n(K''_1x+K'{}'_2y+K''_3z+T'')=0$$

bosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1$ = 314.6
$f_2$ = 88.0
$f_3$ = −481.2
$f_4$ = −99.6

100mm

| | | | |
|---|---|---|---|
| 101.2 Aperture ratio: | | 1:1.10 | |
| nification of projection: | | $-7.997^x$ | |
| angle of view: | | 28.56° | |
| 454 | $d_1$ = 11.0 | $n_1$ = 1.49380 | $L_1$ |
| 542.254 | $d_2$ = 68 | | |
| 976 | $d_3$ = 20.0 | $n_2$ = 1.62286 | $L_2$ |
| 914 | $d_4$ = 2.87 | | |
| ).375 | $d_5$ = 5.0 | $n_3$ = 1.59501 | $L_3$ |
| 27.071 | $d_6$ = 58.8 | | |
| 3.609 | $d_7$ = 5 | $n_4$ = 1.49380 | $L_4$ |
| | $d_8$ = 5 | $n_5$ = 1.45000 | S |
| | $d_9$ = 8 | $n_6$ = 1.51872 | G |

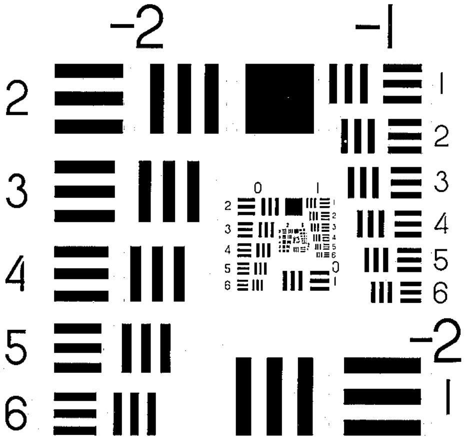

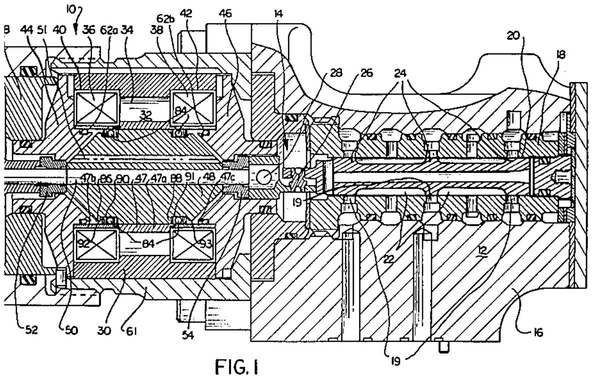

FIG. 1

IMAGE SYSTEM
TEST TARGET
A

U.S. DEPARTMENT OF COMMERCE
PATENT AND TRADEMARK OFFICE

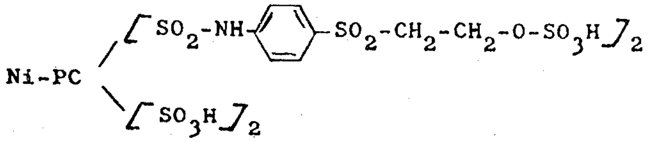

(Ni-Pc = nickel phthalocyanine), a lightening of the super-posed various shades were obtained on the warp at the alkalized places and a green effect was obtained on the weft yarn. In this case, also the cellulose portion was locally dyed by the reactive dyestuff.

What is claimed is:

1. A process for obtaining irregular tone-in-tone effects, shadow effects or multi-color effects on polyester fibers and blends thereof with cellulose fibers by padding polyester fiber-containing warps with a sizing liquor which contains, in addition to a sizing agent, a disperse dyestuff of the formula

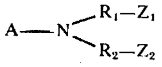

wherein A is a mono or disazo dyestuff radical, $R_1$ is a direct bond, $—CH_2—$ or $—C_2H_4—$, $R_2$ is $—CH_2—$ or $—C_2H_4—$, $Z_1$ is —H, —OH, —CN or $—OOC—CH_3$, $Z_2$ is —H, —CN, $—OOC—CH_3$,

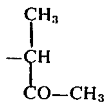

or

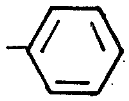

with subsequent drying and weaving these warps with weft yarn which is undyed or dyed in a different manner, without prior fixation, which process comprises binding the piece goods so obtained to a rope, loosely tying them and spraying them with an aqueous solution of an alkaline agent which is free from oxidizing or reducing agents, irregularly and unevenly from the outside, and thermosoling them after opening the rope to fix the dyestuff.

2. The process as defined in claim 1 wherein the alkaline agent is a hydroxide, carbonate or triphosphate of an alkali metal or a mixture thereof.

3. The process as defined in claim 2 in which the alkalinie agent is sodium hydroxide or sodium carbonate.

4. A process as defined in claim 1 wherein the aqueous solution contains 1 to 25 g/l of sodium hydroxide or 1 to 20 g/l of sodium carbonate or a mixture thereof within these ranges and has a pH value of 10.5 to 14.

5. The process as defined in claim 1 of treating polyester fiber/cellulose blends which comprises adding a reactive dyestuff to the aqueous solution.

6. The process as defined in claim 1 wherein an alkali-resistant disperse dyestuff is added to the aqueous solution.

* * * * *